United States Patent Office 3,591,668
Patented July 6, 1971

3,591,668
STRENGTHENING FULLY SINTERED ALUMINA AND TITANIA ARTICLES BY REHEATING IN A FLUORINE ATMOSPHERE
Henry P. Kirchner and Ralph E. Walker, State College, Pa., assignors to Henry P. Kirchner, State College, Pa.
No Drawing. Filed May 28, 1968, Ser. No. 732,521
Int. Cl. C04b 33/32, 33/34, 35/64
U.S. Cl. 264—65    11 Claims

ABSTRACT OF THE DISCLOSURE

Alumina and titania bodies which have previously been fully sintered by conventional techniques are reheated to at least 1400° C. in an atmosphere containing at least 20% fluorine for a period of about 1–4 hours to substantially improve their strength.

---

The present invention relates to a method of physically strengthening polycrystalline ceramic bodies, specifically those of alumina and titania, and to the alumina and titania bodies strengthened by this method.

Alumina and titania bodies are finding more and more uses in present day technology, such as in radomes, windows for passing radiant energy in electronic tubes and in structures used in aerospace technology. In addition, these ceramic materials have found considerable use in refractory technology.

A great drawback in the successful use of such materials has been their relatively fragile nature, both with respect to ordinary physical stresses and strains as well as so-called thermal shock. While these materials can withstand compressive stresses quite well, they are quite poor in their ability to withstand tensile stresses and bending stresses. This quite naturally limits their use in such structures as radomes and the like.

It is an object of the present invention to provide a method of treating alumina and titania bodies so as to improve their bending strength.

It is a further object of the invention to provide treated alumina and titania bodies which have improved bending strength characteristics.

The objects of the invention are achieved by firing the alumina or titania body in a fluorine containing atmosphere for periods of up to 4 hours at temperatures of up to 1650° C., whereby the flexural strength of the alumina and titania bodies is increased.

The method according to the invention comprises placing the alumina or titania body to be strengthened, either in the green state or in the initially fired state, in an oven, surrounding it with an atmosphere containing fluorine, and refiring it in said atmosphere for a period of from 1 to 4 hours at a temperature of from 1450 to 1650° C. In order to determine the fleuxural strength of the thus fired bodies, they are supported at two spaced points and a load applied substantially midway between the points.

Increases in flexural strength of as much as 21,700 p.s.i. have been observed for bodies which have been refired in fluorine, and increases of up to 12,300 p.s.i. have been observed for bodies which are fired "green" in fluorine.

The following examples will serve to illustrate both the method by which the bodies are fired and the results which have been obtained. The steps and the firing conditions as well as the results obtained are set forth in the table shown in the drawing.

EXAMPLES 1 AND 2

Rods of alumina 0.15" in diameter and 3.5" long and made of Alsimag 614, a 96% pure alumina made by American Lava Co. and containing MgO, SiO$_2$ and CaO as impurities, and having less than 0% water absorption, a specific gravity of 3.7, a density of .135 lb./in.$^3$. a softening temperature of 1650° C., a hardness of 9 on Moh's scale, and a linear coefficient of thermal expansion in the range of 25–700° C. of $7.9 \times 10^{-6}$, were divided into three groups of five rods each. One group was a control group, and the rods of the next group, Example 1 in the table, were refired in a fluorine containing atmosphere at 1450° C. for a period of 4 hours in an electric kiln, and cooled in the kiln. The rods of the third group, Example 2 in the table, were refired in a fluorine containing atmosphere at 1500° C. for a period of 4 hours in the same oven and cooled in the kiln. The rods were tested for flexural strength using four point loading with the results given in Table I.

The fluorine containing atmosphere was produced by the heat decomposition of fluorides, such as $$CrF_3 \cdot 3\tfrac{1}{2} H_2O$$

or $AlF_3 \cdot xH_2O$ placed in the kiln with the rods, and contained more than 20% and less than 100% $F_2$ at the firing temperatures.

From the results given, it can be seen that the step of refiring the alumina in a fluorine atmosphere substantially increases the strength thereof. It appears that the higher the firing temperature, the greater the increase in strength.

EXAMPLES 3 AND 4

Bars of aulmina 0.15 x 0.25 inch and 2.5" long and made of a 94% pure alumina made by Frenchtown CFI, Inc. and containing MgO, SiO$_2$ and CaO as impurities, and having 0% water absorption, a specific gravity of 3.61, a density of .124 lb./in.$^3$, a softening temperature of 1971° C., and a linear coefficient of thermal expansion in the range of 25–700° C. of $7.42 \times 10^{-6}$, were divided into three groups of five bars each. One group was a control group, and the bars of the next group, Example 3 in the table, were refired at 1500° C. in an electric kiln in a fluorine containing atmosphere for a period of 4 hours and cooled in the kiln. The bars of the third group, Example 4 in the table, were refired at 1500° C. for a period of 4 hours in a fluorine containing atmosphere in a gas kiln and cooled in the kiln. The bars were tested for flexural strength using four point loading with the results given in Table I. The fluorine containing atmosphere was produced in the same manner as in Examples 1 and 2.

From the results given, it can be seen that the step of refiring the alumina in a fluorine atmosphere substantially increased the strength thereof. The difference in strength between the samples fired in the electric kiln and those fired in the gas kiln may result from the fact that in the gas kiln there is a rapid flow of atmospheric gases because combustion occurs in the chamber with the samples. For this reason, the still atmosphere of the electric kiln is preferred because it appears to give better results.

EXAMPLES 5–8

Rods of alumina 0.134" in diameter and 2.5" long and made of Du-Co DC–265 alumina, a 96% pure alumina made by Du-Co Ceramico Co. and containing MgO, SiO$_2$ and CaO as impurities, and having less than 0.02% water absorption, a specific gravity of 3.7, a density of .134 lb./in.$^3$, a softening temperature of 1650° C., a hardness of 9.0 on Moh's scale, and a linear coefficient of thermal expansion in the range of 20–650° C. of $7.9 \times 10^{-6}$, were divided into five groups of five rods each. One group was a control group, and the rods of the next group, Example 5 in the table, were refired in a fluorine containing atmosphere at 1500° C. for a period of 4 hours in an electric kiln, and cooled in the kiln. The rods of the third group, Example 6 in the table, were refired in a fluorine containing atmosphere at 1650° C. for a period of 1 hour in a gas-fired kiln, and cooled in the kiln. The fourth and fifth groups of rods, Examples 7 and 8 in the table, were fired from the "green" state at a temperature of 1650° C. in a fluorine containing atmosphere, the rods of Example 7 being fired for a period of 1 hour and the rods of Example 8 being fired for a period of 4 hours, and then cooled in the kiln. The rods were tested for flexural strength using four point loading with the results given in Table I. The fluorine containing atmosphere was produced in the same manner as in Examples 1 and 2.

From the results given, it can be seen that the step of refiring the alumina in a fluorine atmosphere substantially increased the strength thereof. The increase in firing temperature and shortening of time of refiring apparently made the increase in strength somewhat smaller. It can further be seen that the firing from the green state in the fluorine atmosphere substantially increased the strength, with the longer firing time giving a greater increase in strength.

EXAMPLE 9

Alumina rods of Alsimag 614, which were 0.125" in diameter and 2.25" long, were divided into two groups, one of which was a control group. The rods of the other group were refired in an atmosphere containing fluorine at a temperature of 1500° C. for two hours in an electric kiln and cooled in the kiln. The fluorine containing atmosphere was produced in the same manner as in Examples 1 and 2. The rods were tested for flexural strength using four point loading with the results given in Table II. The results show that the strength was substantially increased, the average value being even higher than that for Example 2, in which the conditions were nearly the same. In the actual test results, the highest strength sample has a strength of just over 81,000 p.s.i.

EXAMPLES 10–12

It has been found beneficial to quench the alumina rather than simply cool it in the kiln where it has been fired. A number of rods of Alsimag 614, which were 0.15" in diameter and 3.5" long, were divided into four groups, a control group of 19 rods, and three other groups of 5 rods each. The second group was simply refired in a fluorine containing atmosphere at a temperature of 1500° C. for 1 hour in an electric kiln and cooled in the kiln, much in the manner of Example 9, and the thus fired rods tested for flexural strength under four point loading. The results are given in Table III.

The other two groups were refired in a fluorine containing atmosphere at respective temperature of 1500° C. and 1450° C. for a period of 1 hour in an electric kiln, and were then quenched in a blast of air at room temperature. These groups were tested for flexural strength in the same manner with the results given in Table III. In both instances, the fluorine containing atmosphere was produced in the same manner as in Examples 1 and 2.

It will be seen that even though the "as received" strength was somewhat lower than the corresponding strength of the controls in Example 9, the strength after the heating quenching was significantly higher than the strength of the rods which were simply refired and not quenched.

EXAMPLES 13 AND 14

The benefits of firing in a fluorine containing atmosphere carry over into treatments which include a further refiring and quenching and which include glazing and quenching.

A number of alumina rods of Alsimag 614, which were 0.125" in diameter and ⅖" long, were divided into three groups, a control group and two other groups. The first of the other groups was first refired in a fluorine containing atmosphere at a temperature of 1500° C. for a period of 2 hours, cooled in the kiln, and again refired in air at the same temperature for a period of 1 hour, and then quenched in a blast of air at room temperature. The firing was in an electric kiln. The rods were tested for flexural strength under four point loading, with the results given in Table IV.

The second of the other groups was first refired in a flourine containing atmosphere at a temperature of 1500° C. for a period of 2 hours, cooled in the kiln, glazed and fired in an air atmosphere at a temperature of 1500° C. for 1 hour, and then quenched in air at ambient temperature. The rods were tested in the same manner with the results given in Table IV. In both instances, the fluorine containing atmosphere was obtained in the same manner as in Examples 1 and 2.

It can be seen that the strengths are significantly increased over the "as received" strength of the controls.

EXAMPLES 15 AND 16

A number of titania ($TiO_2$) bars which were 3" x ⅜" x ¼" were divided into four groups. The first two groups were initially fired at 1500° C. for 1 hour, and were then refired at 1400° C. for 1 hour, the first group being fired in air and the second group being fired in a fluorine containing atmosphere prepared as described in Example 1. The kiln was an electric kiln and the samples were cooled in the kiln. The bars were tested for strength under four point loading, with the results given in Table V.

The third and fourth groups were initially fired at 1400° for 1 hour, and the fourth group was then refired in a fluorine containing atmosphere for 1 hour at 1400° C. The kiln and cooling conditions were the same as for the first two groups. The bars were tested for strength in the same manner as the first two groups with the results also given in Table V.

It can be seen that the refiring in the fluorine containing atmosphere significantly increases the strength of the titania.

TABLE I.—EFFECT OF FIRING OR REFIRING IN A FLUORINE CONTAINING ATMOSPHERE ON FLEXURAL STRENGTH OF CONTROLS

| | | Firing conditions | | | Flexural strength data, p.s.i. | |
|---|---|---|---|---|---|---|
| Example | Material | Temp., °C. | Time, hrs. | No. samples | Average flexural strength | Strength difference |
| | ALSIMAG 614 rods, as received | | | 5 | 42,600 | |
| 1 | ALSIMAG 614 rods, refired | 1,450 | 4 | 5 | 53,200 | +10,600 |
| 2 | do | 1,500 | 4 | 5 | 53,800 | +11,200 |
| | Frenchtown 94% bars, as cut | | | 5 | 34,200 | |
| 3 | Frenchtown 94% bars, refired | 1,500 | 4 | 5 | 37,800 | [1] +3,600 |
| 4 | do | 1,500 | 4 | 5 | 34,500 | [2] +300 |
| | Du-Co DC-265 rods, as received | | | 5 | 46,100 | |
| 5 | Du-Co DC-265 rods, refired | 1,500 | 4 | 5 | 52,200 | +6,100 |
| 6 | do | 1,650 | 1 | 5 | 46,900 | +800 |
| 7 | Du-Co DC-265 rods, fired from green state | 1,650 | 1 | 5 | 57,200 | +11,100 |
| 8 | do | 1,650 | 4 | 5 | 58,400 | +12,300 |

[1] Electric kiln.
[2] Gas kiln.

TABLE II.—FLEXURAL STRENGTH OF ALSIMAG 614 ALUMINA TREATED IN A FLUORINE CONTAINING ATMOSPHERE

[Rods 0.125" diameter]

| | | Treatment conditions | | | Flexural strength data, p.s.i. | |
|---|---|---|---|---|---|---|
| Example | Treatment | Temp., °C. | Time, hrs. | No. samples | Average strength | Strength difference |
| | "As received" controls | | | 19 | 49,700 | |
| 9 | Refired in atmosphere containing fluorine | 1,500 | 2 | 19 | 71,400 | 21,700 |

TABLE III.—FLEXURAL STRENGTH OF ALSIMAG 614 ALUMINA FIRED IN AN ATMOSPHERE CONTAINING FLUORINE

[Rods 0.15" diameter]

| | | Treatment conditions | | | Flexural strength data, p.s.i. | |
|---|---|---|---|---|---|---|
| Example | Treatment | Temp., °C. | Time, hr. | No. samples | Average strength | Strength difference |
| | "As received" controls | | | 19 | 44,800 | |
| 10 | Refired in fluorine containing atm., cooled with kiln. | 1,500 | 1 | 5 | 56,100 | +11,300 |
| 11 | Refired in fluorine containing atm., quenched. | 1,500 | 1 | 5 | 80,700 | +35,900 |
| 12 | do | 1,450 | 1 | 5 | 78,200 | +33,400 |

TABLE IV.—FLEXURAL STRENGTH OF ALSIMAG 614 ALUMINA TREATED IN A FLUORINE CONTAINING ATMOSPHERE FOLLOWED BY GLAZING AND QUENCHING

[Rods 0.125" diameter]

| | | Treatment conditions | | | Flexural strength data, p.s.i. | |
|---|---|---|---|---|---|---|
| Example | Treatment | Temp., °C. | Time, hrs. | No. samples | Average strength | Strength difference |
| | "As received" controls | | | 19 | 49,700 | |
| 13 | Refired in atm. containing fluorine: | | | | | |
| | Refired | 1,500 | 2 | | | |
| | Quenched | 1,500 | 1 | 19 | 67,300 | 17,600 |
| 14 | Refired in atm. containing fluorine: | | | | | |
| | Glazed | 1,500 | 2 | | | |
| | Quenched | 1,500 | 1 | 19 | 95,600 | 45,900 |

TABLE V.—FLEXURAL STRENGTH OF TITANIA TREATED IN A FLUORINE CONTAINING ATMOSPHERE

| | | Treatment conditions | | | Flexural strength data, p.s.i. | |
|---|---|---|---|---|---|---|
| Example | Treatment | Temp., °C. | Time, hr. | No. samples | Average strength | Strength difference |
| | Controls | 1,400 | 1 | 5 | 16,300 | |
| 15 | Refired in fluorine containing atm | 1,400 | 1 | 5 | 20,300 | +4,000 |
| | Controls | 1,400 | 1 | 5 | 17,500 | |
| 16 | Refired in fluorine containing atm | 1,400, 1,400 | 1, 1 | 5 | 23,700 | +6,200 |

What is claimed is:

1. A method of strengthening substantially nonporous and substantially fully fired alumina bodies, comprising the steps of placing the bodies in an atmosphere containing more than 20% and less than 100% fluorine and the remainder air and firing the bodies at a temperature of from about 1450° C. to about 1650° C. for a period of from about 1 to about 4 hours.

2. A method as claimed in claim 1 in which the temperature is 1450° C. and the time is 4 hours.

3. A method as claimed in claim 1 in which the temperature is 1500° C. and the time is 2 hours.

4. A method as claimed in claim 1 in which the temperature is 1500° C. and the time is 2 hours.

5. A method as claimed in claim 1 in which the temperature is 1500° C. and the time is 4 hours.

6. A method as claimed in claim 1 further comprising the step of cooling the fired bodies in the kiln.

7. A method as claimed in claim 1 further comprising the step of quenching the fired bodies.

8. A method as claimed in claim 7 in which the step of quenching comprises quenching in air at ambient temperature.

9. A method of strengthening substantially nonporous and substantially fully fired titania bodies comprising the steps of placing the bodies in an atmosphere of more than 20% and less than 100% fluorine and the remainder air and refiring the bodies at a temperature of about 1400° C. for a period of about 1 hour.

10. A strengthened alumina body formed by the method of placing a body of substantially non-porous and substantially fully fired alumina in an atmosphere containing more than 20% and less than 100% fluorine and the remainder air and firing the body at a temperature of about 1450° C. to about 1650° C. for a period of from one to about four hours.

11. A strengthening titania body formed by the method of placing a body of substantially non-porous and substantially fully fired alumina in an atmosphere of more than 20% and less than 100% fluorine and the remainder air and refiring the body at a temperature of about 1400° C. for a period of about one hour.

References Cited
UNITED STATES PATENTS

| | | | |
|---|---|---|---|
| 3,291,622 | 12/1966 | Mandorf, Jr. et al. | 106—39 |
| 3,312,759 | 4/1967 | Letter | 106—39 |
| 3,378,498 | 4/1968 | Weatherley | 106—65 |
| 3,402,024 | 9/1968 | Marshall, Jr. et al. | 106—65 |

OTHER REFERENCES

J. E. Burke (ed.), "Progress In Ceramic Science," vol. 3, 1963, The Macmillan Company, New York, pp. 240–247.

Eugene Ryshkewitch, "Oxide Ceramics," 1960, Academic Press, New York, pp. 183 and 205–221.

JULIUS FROME, Primary Examiner

J. H. MILLER, Assistant Examiner

U.S. Cl. X.R.

106—39, 65; 264—66, 82, 346